S. M. WADE.
GROUSER.
APPLICATION FILED MA. 4, 1920.

1,374,481.

Patented Apr. 12, 1921.

WITNESSES
George C. Myers
C. E. Trainor

INVENTOR
S. M. WADE,
BY Munn & Co.
ATTORNEYS

S. M. WADE.
GROUSER.
APPLICATION FILED MAY 4, 1920.
1,374,481.
Patented Apr. 12, 1921.
2 SHEETS—SHEET 2.
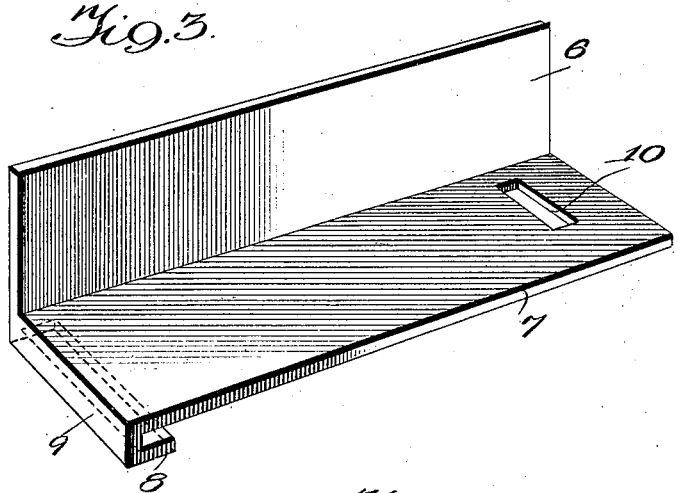
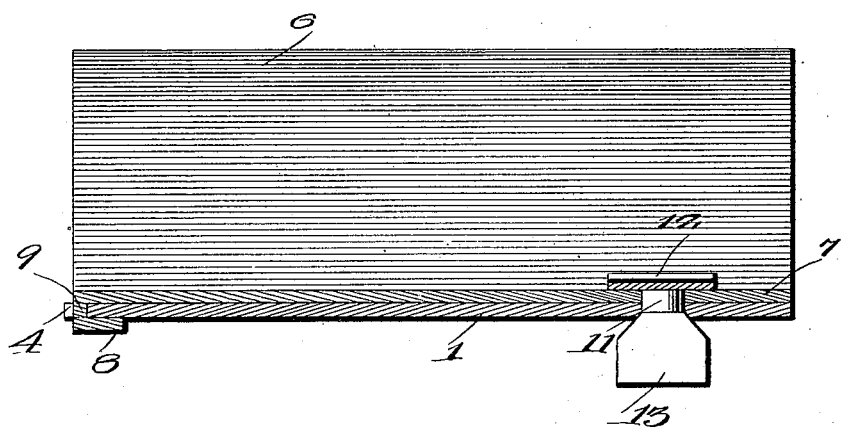
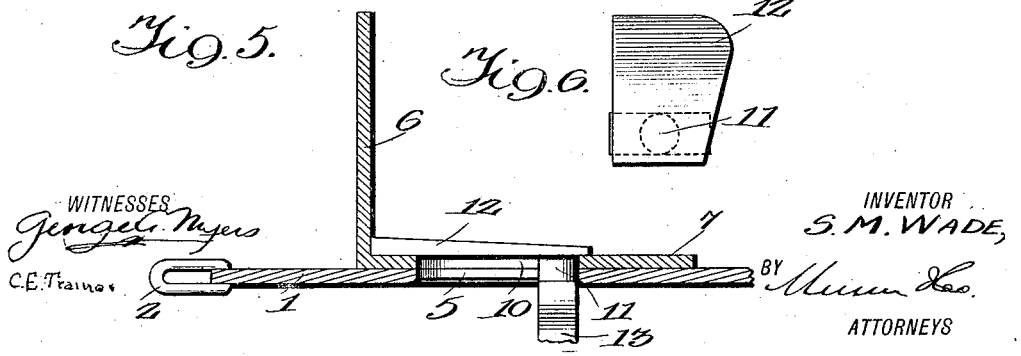
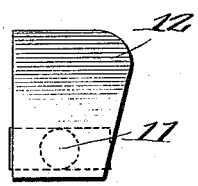
INVENTOR
S. M. WADE,
ATTORNEYS

UNITED STATES PATENT OFFICE.

STANLEY MONTE WADE, OF OAKLAND, CALIFORNIA.

GROUSER.

1,374,481.   Specification of Letters Patent.   Patented Apr. 12, 1921.

Application filed May 4, 1920. Serial No. 378,741.

*To all whom it may concern:*

Be it known that I, STANLEY MONTE WADE, a citizen of the United States, and a resident of Oakland, in the county of Alameda and State of California, have invented certain new and useful Improvements in Grousers, of which the following is a specification.

My invention is an improvement in grousers, and has for its object to provide a device of the character specified, capable of attachment to a link of a tractor chain, to increase the traction of the chain, wherein the grouser is easily attached and may be detached when desired.

In the drawings:

Fig. 3 is a similar view of the grouser detached;

Fig. 4 is a longitudinal section through the link and grouser;

Fig. 5 is a section at right angles to Fig. 4 on the line of the holding pin;

Fig. 8 is a perspective view looking from above.

As is known, a track laying tractor track is a series of connected metal links forming an endless belt or chain, and the grouser forming the subject of the present invention is designed to be attached to sundry or all of the links to increase the traction by providing a grouser or cleat extending transversely of the link for cutting into the ground to provide a secure grip for the link.

Figure 1:
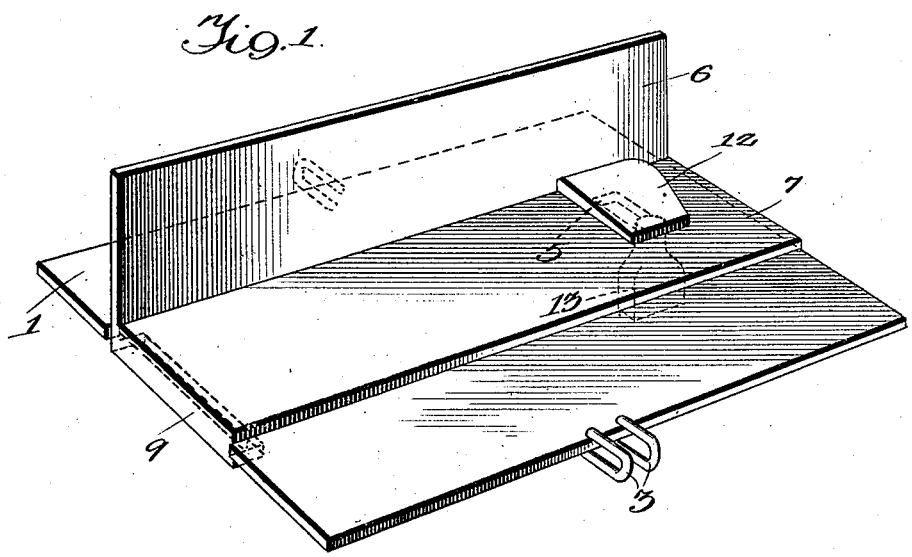
Figure 1 is a perspective view of the improved grouser in place on the link of a tractor chain.
Figure 2:
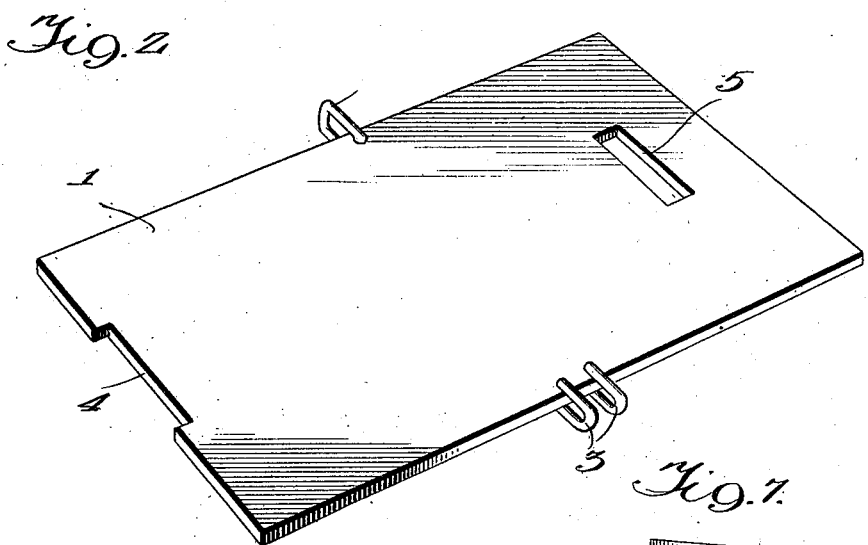
Fig. 2 is a perspective view of the link.

In the present embodiment of the invention, tractor chain links, one of which is shown at 1 in Figs. 1 and 2 have the usual connecting eyes 2 and 3 at their opposite side edges for connection with adjacent links, and sundry or all of the said links are provided at one end with a notch or recess, and near the other end with a slot 5 extending transversely of the link.

The grouser is in the form of an angle plate, consisting of portions 6 and 7 extending at right angles with respect to each other, the portion 7 being adapted to lie upon the outer face of the link, with the portion 6 extending transversely of the direction of motion of the tractor chain and approximately perpendicularly to the portion 7. At one end, the portion 7 of the grouser is provided with a flange 8 overlying that face of the portion 7 which is remote from the portion 6 in spaced relation, and the connecting portion 9 between the flange and the body of the portion 7 is adapted to engage within the notch 4, as clearly shown in Figs. 1 and 4. This notch or recess is of a length to receive this connecting web 9 and near the other end the portion 7 of the grouser has a slot 10 extending transversely thereof, and adapted to register with the slot 5 of the link 1, as clearly shown in Fig. 5.

The grouser is locked to the link by means of the pins shown in Figs. 1, 3, 5, 6, 7 and 8. The said pins comprise a cylindrical portion 11 having at one end a head 12 and at the other a cross head 13. The cylindrical portion 11 of the pin is of a diameter to fit smoothly in the slots 5 and 10, as shown in Fig. 5, and it is of a length to permit the cross head 13 to be below the link 1 when the head 12 is above the portion 7 of the grouser. The cross head 13 extends transversely of the head 12, and referring to Figs. 5 and 7 it will be seen that the head 12 has one of its edges near the periphery of the cylindrical portion 11 or the body of the pin and that the said head is of greatest thickness at that end which is remote from the body of the pin. The distance between the body of the pin and the end of the head remote from the pin is equal to the distance from the portion 6 of the grouser to the opposite end of the slot 5, when the grouser is in place on the link, with the slots 5 and 10 in register. The arrangement is such that when the pin is passed through the slots as shown in Fig. 5, the thick end of the head 12 will abut the portion 6 of the grouser.

The head 13 is of a thickness to pass through the registering slots when said cross head is turned into register with the slot and when the pin is turned to bring the pin transversely of the slots the free edge of the thick end of the head 12 will abut the portion 6 of the grouser.

In placing the pin, the cross head 13 is turned into register with the slots 5—10, and passed through the slots, until the head 12 rests upon the upper face of the portion 7 of the grouser. Now the pin is turned until the free edge of the thick end of the head engages the portion 6 of the grouser.

Figures 6, 7:
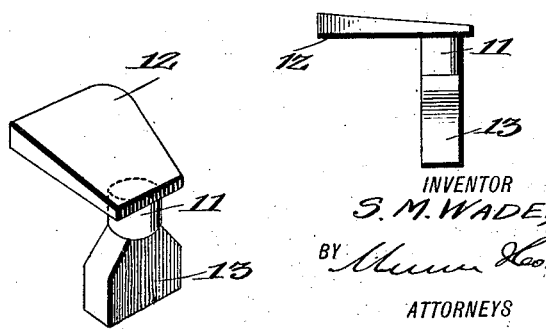
Fig. 6 is a top plan view of the pin.
Fig. 7 is a side view.

Referring to Figs. 6 and 8, it will be seen that one of the corners of the head 12 remote from the pin body is rounded while the other is an angle. This arrangement permits the head to be turned in one direction into place, that is the head may be turned into place by swinging it from left to right in Fig. 1. To release the pin the head is swung from right to left in Fig. 1 until the cross head is parallel with the slots, then the pin is moved toward the portion 6 of the grouser until the cross head is in register with the slots. Now the pin may be withdrawn and the grouser detached.

In use, there is no tendency to disengagement of the pin. When that end of the portion 6 of the grouser adjacent to the pin is moved toward the eyes 3, and this will be the direction in which it tends to move under the strains of the moving tractor, the pin will be held more tightly against the ends of the slots. The links of any tractor are easily shaped to receive the grouser, it only being necessary to notch one end of the link and to provide a slot near the other.

While the grouser is especially designed for a track laying tractor, it is obvious that it might be used with a tractor of the wheel type without any modification, the rim of the wheel being provided with the notches and the slots.

I claim:

1. In combination, a grouser, and an element to which the grouser is to be attached, said grouser comprising an angular plate having a portion adapted to lie on the element and a portion to extend perpendicular thereto, said element having a notch at one end of the grouser and a slot near the other, the grouser having at the first named end a hook for engaging the notch and at the last named end a slot registering with the slot of the element and a locking pin for engaging the slots, said pin having at each end a head one of which is adapted to engage above the grouser and the other below the element, one of the heads being shaped to fit the slots so that when turned into register therewith it may move through the slots.

2. In combination, a grouser and an element to which the grouser is to be attached, said grouser having at one end a hook and at the other a pin mounted to slide laterally with respect thereto, the element having a slot through which the pin is adapted to pass, when the hook is engaged with the element, said pin having a head which will pass through the slot when in register therewith and will extend transversely of the slot when the hook is engaged with the element.

STANLEY MONTE WADE.